US012705343B2

(12) United States Patent
Lande Blau et al.

(10) Patent No.: US 12,705,343 B2
(45) Date of Patent: Aug. 11, 2026

(54) TECHNIQUES FOR CYBERSECURITY INSPECTION OF MULTIPLE LAYER VIRTUAL WORKLOADS

(71) Applicant: Wiz, Inc., New York, NY (US)

(72) Inventors: Amir Lande Blau, Tel Aviv (IL); Roy Reznik, Tel Aviv (IL); Bar Magnezi, Tel Aviv (IL); Yaniv Joseph Oliver, Tel Aviv (IL)

(73) Assignee: Wiz, Inc., New York, NY (US)

( * ) Notice: Subject to any disclaimer, the term of this patent is extended or adjusted under 35 U.S.C. 154(b) by 261 days.

(21) Appl. No.: 18/333,178

(22) Filed: Jun. 12, 2023

(65) Prior Publication Data

US 2024/0411873 A1 Dec. 12, 2024

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC ......................... G06F 21/554; G06F 2221/034
See application file for complete search history.

(56) References Cited

U.S. PATENT DOCUMENTS 9,811,806 B1 * 11/2017 Kuang .................. G06F 16/128
10,032,032 B2 7/2018 Suarez et al.
10,223,534 B2 3/2019 Stopel et al.
10,997,293 B2 5/2021 Wiest et al.
2017/0109536 A1 * 4/2017 Stopel .................. G06F 21/577
2018/0359259 A1 * 12/2018 Leon ....................... G06F 9/445

FOREIGN PATENT DOCUMENTS

CN 112860335 A * 5/2021 ............. H04L 67/56

OTHER PUBLICATIONS

C. Aravindan. • Terrance Frederick • V. Hemamalini. • Madhu Vidha J. Cathirine; An Extensive Research on Cyber Threats using Learning Algorithm; 2020 International Conference on Emerging Trends in Information Technology and Engineering (ic-ETITE) (2020, pp. 1-8); (Year: 2020).*

(Continued)

*Primary Examiner* — Luu T Pham
*Assistant Examiner* — Chao Wang
(74) *Attorney, Agent, or Firm* — M&B IP Analysts, LLC

(57) ABSTRACT

A system and method for cybersecurity inspection of a volume based on image layers is disclosed. In some implementations, the method may include generating an inspectable disk based on a volume of a virtual instance, the volume generated based on a plurality of images, each image corresponding to a unique layer of a plurality of layers. In addition, the method may include parsing a manifest associated with the volume, the manifest including an identifier of each unique layer. The method may include determining an order of layers based on the manifest, where a first layer of the virtual instance is deployed prior to a second layer of the virtual instance. Moreover, the method may include initiating inspection for a cybersecurity object on a first layer of the plurality of layers. Also, the method may include initiating a mitigation action in response to detecting the cybersecurity object.

15 Claims, 4 Drawing Sheets

(56) References Cited

OTHER PUBLICATIONS

Munni Venuturumilli • V L Manaswini Nune • M. Praveen • Helina Rajini Suresh • G. Elumalai • P. Chitra; Enhancing Cybersecurity: A Scalable System for Real-Time Threat Detection Using ML and Automated Response; 2024 International Conference on Innovative Computing, Intelligent Communication; (Year: 2024).*

Koustav Sadhukhan • Rao Arvind Mallari • Tarun Yadav; Cyber Attack Thread: A control-flow based approach to deconstruct and mitigate cyber threats; 2015 International Conference on Computing and Network Communications (CoCoNet) (2015, pp. 170-178); (Year: 2015).*

* cited by examiner

TECHNIQUES FOR CYBERSECURITY INSPECTION OF MULTIPLE LAYER VIRTUAL WORKLOADS

TECHNICAL FIELD

The present disclosure relates generally to cybersecurity inspection and specifically to inspecting multiple layers of a software container virtualization.

BACKGROUND

Software containers allow for deploying software applications with relative ease in a computing environment, which makes for a particularly useful way of scaling a computing environment, such as a cloud computing environment.

Software containers are deployed for example from images. For example, a Kubernetes® software container can be deployed using Amazon® Machine Images (AMI), which allows creating a software image, then deploying multiple instances of that image in a cloud computing environment, as such instances are needed.

One aspect of software containers is that an image can have multiple authors. For example, an initial image is generated by a first author, which includes basic functions, such as operating system libraries, and is also known as a base image. A second author can build on top of the base image, and create a second software layer, which includes installation, for example, of various software packages, applications, and so forth.

While this allows for collaboration and quick deployment, version management and keeping track of authors presents a challenge. For example, an attacker might gain access to a base image, and deploy some malware on top of it, corrupt a software library, and the like, so that when the image is next deployed, a version that presents a cybersecurity risk is deployed. This becomes increasingly complicated as the number of layers of a software image grows.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Some implementations herein relate to a method. For example, the method may include generating an inspectable disk based on a volume of a virtual instance, the volume generated based on a plurality of images, each image corresponding to a unique layer of a plurality of layers. Method may also include parsing a manifest associated with the volume, the manifest including an identifier of each unique layer. Method may furthermore include determining an order of layers based on the manifest, where a first layer of the virtual instance is deployed prior to a second layer of the virtual instance. Method may in addition include initiating inspection for a cybersecurity object on a first layer of the plurality of layers. Method may moreover include initiating a mitigation action in response to detecting the cybersecurity object. Other embodiments of this aspect include corresponding computer systems, apparatus, and computer programs recorded on one or more computer storage devices, each configured to perform the actions of the methods.

The described implementations may also include one or more of the following features. Method may include: initiating inspection for the cybersecurity object on the second layer, in response to determining that inspection of the first layer is complete. Method may include: searching the manifest for a predetermined data field; and extracting a value associated with the predetermined data field from the manifest. Method may include: inspecting the second layer for a second cybersecurity object, in response to detecting a cybersecurity object on the first layer. Method may include: deleting an instruction to inspect the second layer for a second cybersecurity object, in response to detecting that the first layer does not include a first cybersecurity object. Method may include: generating a node representing the cybersecurity object on a security graph, where the security graph includes a representation of a computing environment in which the virtual instance is deployed; and connecting the node representing the cybersecurity object to a node representing the virtual instance in the security graph. Method may include: deprovisioning the virtual instance in response to detecting the cybersecurity object. Method may include: initiating the mitigation action further in response to detecting a plurality of cybersecurity objects. Method where the cybersecurity object is any one of: an endpoint, an open port, a password, a certificate, a cryptographic key, an encryption key, a decryption key, a policy, a file, an application, an operating system, a registry file, a directory name, a hash value, a code object, a malware code, a malware signature, and any combination thereof. Implementations of the described techniques may include hardware, a method or process, or a computer tangible medium.

Some implementations herein relate to a non-transitory computer-readable medium storing one or more instructions. For example, non-transitory computer-readable medium storing one or more instructions that, when executed by one or more processors of a device, cause the device to: generate an inspectable disk based on a volume of a virtual instance, the volume generated based on a plurality of images, each image corresponding to an unique layer of a plurality of layers. The medium storing one or more instructions that, when executed by one or more processors of a device, cause the device to: parse a manifest associated with the volume, the manifest including an identifier of each unique layer. The medium storing one or more instructions that, when executed by one or more processors of a device, cause the device to: determine an order of layers based on the manifest, where a first layer of the virtual instance is deployed prior to a second layer of the virtual instance. The medium storing one or more instructions that, when executed by one or more processors of a device, cause the device to: initiate inspection for a cybersecurity object on a first layer of the plurality of layers. The medium storing one or more instructions that, when executed by one or more processors of a device, cause the device to: initiate a mitigation action in response to detecting the cybersecurity object. Other embodiments of this aspect include corresponding computer systems, apparatus, and computer programs recorded on one or more computer storage devices, each configured to perform the actions of the methods.

Some implementations herein relate to a system. For example, system may include a processing circuitry. System may also include a memory, the memory containing instructions that, when executed by the processing circuitry, configure the system to: generate an inspectable disk based on a volume of a virtual instance, the volume generated based on a plurality of images, each image corresponding to a unique layer of a plurality of layers. System may in addition be configured to parse a manifest associated with the volume, the manifest including an identifier of each unique layer. System may moreover be configured to determine an order of layers based on the manifest, where a first layer of the virtual instance is deployed prior to a second layer of the virtual instance. System may also be configured to initiate inspection for a cybersecurity object on a first layer of the plurality of layers. System may furthermore be configured to initiate a mitigation action in response to detecting the cybersecurity object. Other embodiments of this aspect include corresponding computer systems, apparatus, and computer programs recorded on one or more computer storage devices, each configured to perform the actions of the methods.

The described implementations may also include one or more of the following features. System where the memory contains further instructions which when executed by the processing circuitry further configure the system to: initiate inspection for the cybersecurity object on the second layer, in response to determining that inspection of the first layer is complete. System where the memory contains further instructions which when executed by the processing circuitry further configure the system to: search the manifest for a predetermined data field; and extract a value associated with the predetermined data field from the manifest. System where the memory contains further instructions which when executed by the processing circuitry further configure the system to: inspect the second layer for a second cybersecurity object, in response to detecting a cybersecurity object on the first layer. System where the memory contains further instructions which when executed by the processing circuitry further configure the system to: delete an instruction to inspect the second layer for a second cybersecurity object, in response to detecting that the first layer does not include a first cybersecurity object. System where the memory contains further instructions which when executed by the processing circuitry further configure the system to: generate a node representing the cybersecurity object on a security graph, where the security graph includes a representation of a computing environment in which the virtual instance is deployed; and connect the node representing the cybersecurity object to a node representing the virtual instance in the security graph. System where the memory contains further instructions which when executed by the processing circuitry further configure the system to: deprovision the virtual instance in response to detecting the cybersecurity object. System where the memory contains further instructions which when executed by the processing circuitry further configure the system to: initiate the mitigation action further in response to detecting a plurality of cybersecurity objects. System where the cybersecurity object is any one of: an endpoint, an open port, a password, a certificate, a cryptographic key, an encryption key, a decryption key, a policy, a file, an application, an operating system, a registry file, a directory name, a hash value, a code object, a malware code, a malware signature, and any combination thereof. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
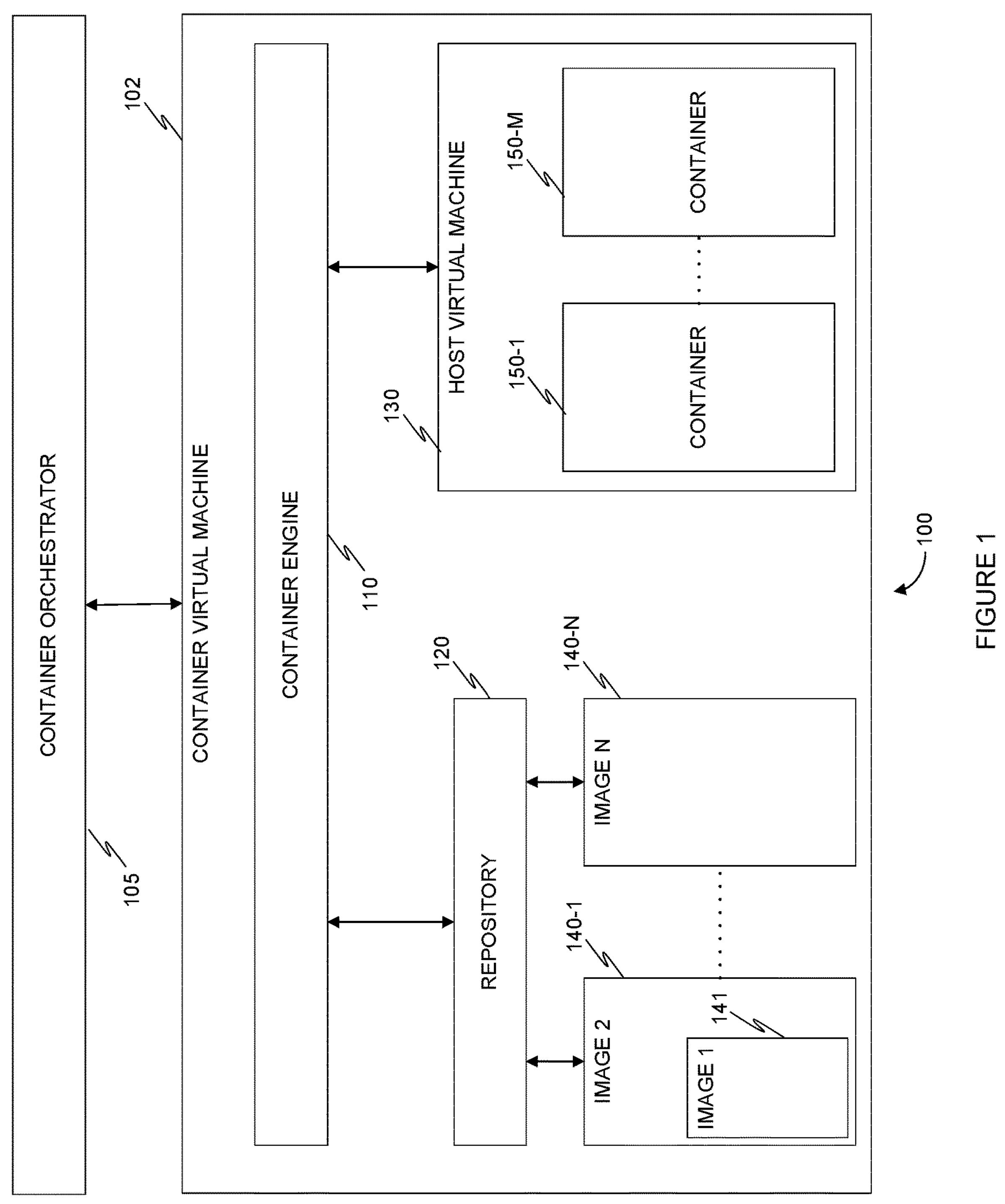
FIG. 1 is an example diagram of a container deployment, utilized to describe some of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for inspecting a virtual instance, such as a software container, for cybersecurity threats. According to an embodiment, inspection is performed per layer. In some embodiments, inspection is performed so that a first layer is inspected prior to a second layer, wherein the first layer is deployed prior to deployment of the second layer.

In certain embodiments, inspection for cybersecurity objects is performed in response to accessing a manifest, such as a manifest file, and determining from the manifest file an order by which multiple layers of a single image are deployed, and inspecting each layer based on the determined order.

FIG. 1 is an example diagram of a container deployment 100, utilized to describe some of the disclosed embodiments. A container engine 110 is a software application which is deployed in a cloud computing environment (or infrastructure). In an embodiment, a container engine 110 is configured to receive user input, process input and other communication with a container orchestrator, pull container images from a repository server, generating a mount point from a container image, generating metadata based on a container image, and the like. In certain embodiments, the container engine 110 is further configured to call a container runtime to actually deploy a container from a container image. A container engine may be, for example, Docker®. A container runtime may be, for example, runc.

In an embodiment, the container engine 110 is deployed in a container virtual machine 102, which is a virtual machine on which a container engine 110 is run. In some embodiments, the container virtual machine is communicatively coupled with a container orchestrator 105. A container orchestrator 105 may be communicatively coupled with a plurality of container virtual machines 102, each container virtual machine 102 running a container engine 110. For example, a container orchestrator 105 may be a Kubernetes® container orchestration system, while the container engine 110 is a Docker® Engine.

According to an embodiment, the container engine 110 is configured to pull container images which are stored in a repository 120. In an embodiment, the repository 120 is implemented as a storage, and exposed by a server (not depicted) with which the container engine 110 communicates, for example over a network interface, in order to pull container images therefrom, for example based on an image identifier.

In some embodiments, a repository 120 is configured to host a plurality of container images, such as container images 140-1 through 140-N, individually referenced as container image 140, generally referenced as container images 140, where 'N' is an integer having a value of '2' or more.

In certain embodiments, each container image 140 may in turn include additional container images, which are also referred to as layers. A container image (layer) is generated when a build command is performed on a first container image. For example, a first container image (i.e., a parent image) 141 is generated by a first build command. A second build command causes a second image (i.e., a child image) 140-1 to be generated, which is based off of the first container imager 141.

In container deployments, a base image is a container image from which other container images may be generated, and that has no parent image. In an embodiment, a base image includes an operating system, and software tools which allow to install software packages or otherwise update the container image. In the example above, the first container image 141 is a base image. A second image 140-1 may include a plurality of layers, which are not shown here for simplicity.

In an embodiment, any one of the container images 140 may be intermediate images, which are sometimes referred to as base images. Intermediate images are images which include a base image, and also include at least an additional layer which adds functionality to the deployed container. In order to keep the number of layers small, a multi-stage build process may be utilized. For example, in Docker® multiple FROM statements may be used to call different base images, each of which begins a new stage in the build. Objects may be selected from one stage to the next, which allows discarding unselected objects from the final image.

Where a container image 140 may include multiple images, such as container image 140-1 which includes container image 141, a container engine 110 will typically specify a mount point from which the live container is deployed. The container engine 110 may deploy, or may otherwise configure another workload to deploy, a live container. For example, the container engine 110 may configure a host virtual machine (VM) 130 to deploy thereon a plurality of containers 150-1 through 150-M, individually referenced as container 150 and generally referenced as containers 150, where 'M' is an integer having a value of '2' or greater.

In an embodiment, the VM 130 may run a host, such as Red Hat® Enterprise Linux (RHEL) Atomic Host, which runs containerized processes (i.e., containers) provisioning resources from the VM 130. In other embodiments, the host application (e.g., RHEL Atomic Host) may run as a virtual instance in a cloud computing environment, as a local machine (i.e., bare metal) in a network environment, and the like.

Figure 2:
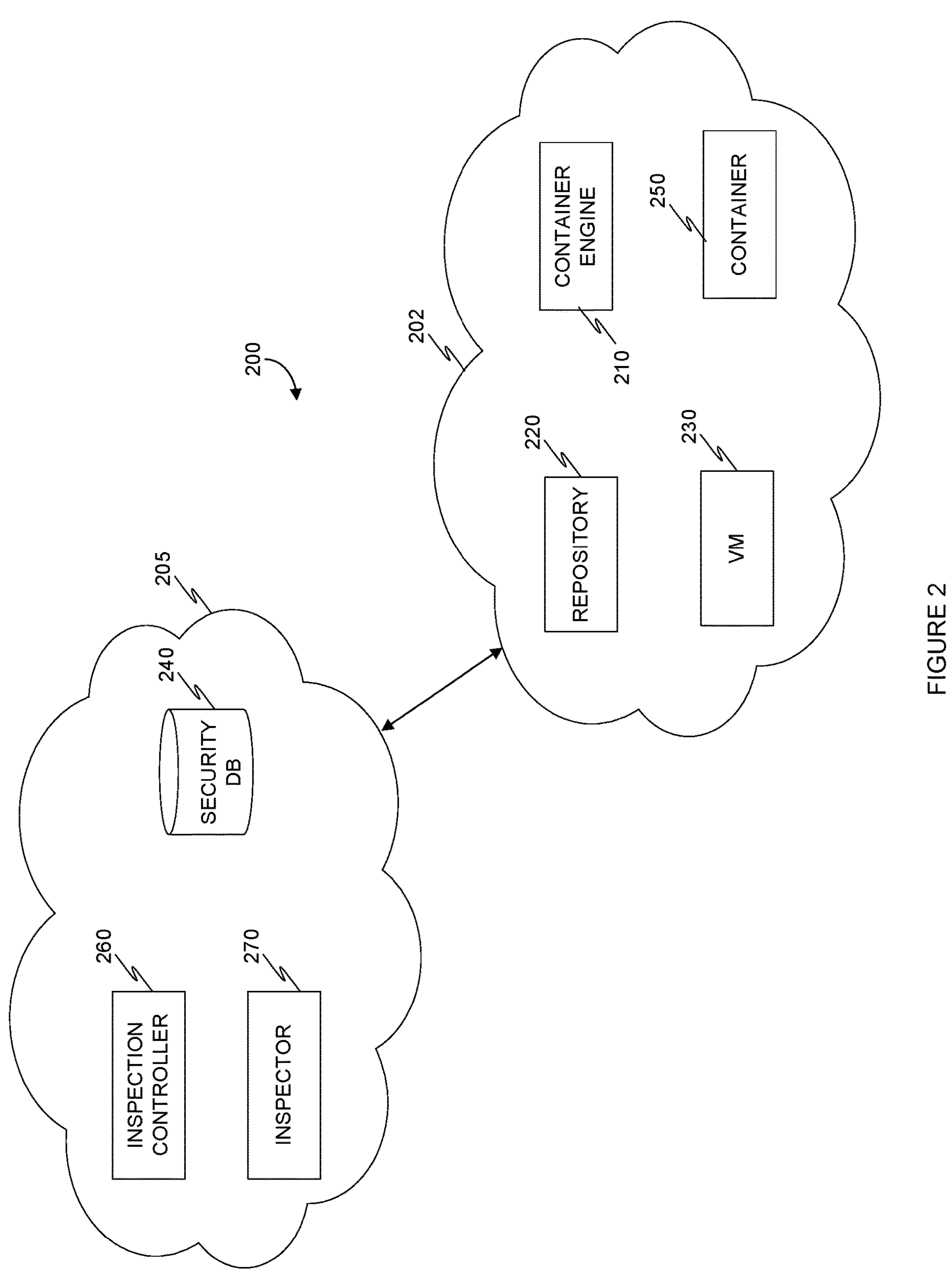
FIG. 2 is an example network diagram including a production environment and an inspection environment, utilized to describe an embodiment.

FIG. 2 is an example network diagram 200 including a production environment 202 and an inspection environment 205, utilized to describe an embodiment. A production environment 202 is a cloud computing environment which provides services and resources to client devices. A client device (not shown) may be for example a laptop computer, personal computer, other computing device which is in a network external to the cloud computing environment, and the like. The production environment 202 may be implemented, for example, as a VPC on a cloud computing infrastructure, such as Amazon® Web Services (AWS), Google® Cloud Platform (GCP), Microsoft® Azure, and the like.

In an embodiment, the production environment 202 includes cloud entities, such as resources and principals. A resource is a cloud entity which supplies functionality, such as processing power, memory, storage, communication, and the like. A resource may supply more than one functionality. Resources may include, for example, virtual machines (VMs), such as VM 230, container engines such as container engine 210, serverless functions (not shown), and the like.

In an embodiment, the production environment 202 may further include an application programming interface (API), through which actions in the cloud environment may be triggered. A container engine 210 may be implemented using Kubernetes® or Docker®. A serverless function may implemented using Lambda®. A VM 230 may be implemented using Oracle® VirtualBox, Azure Virtual Machines, and the like. In certain embodiments, the container engine 210 may configure a VM 230 to run a containerized application 250 (also referred to as container 250). The container engine 210 is configured to access a repository 220, such as AWS Elastic Container Registry (ECS), from which an image is pulled and mounted at a mount point to generate a live container, such as container 250.

A principal is a cloud entity which acts on a resource, meaning it can request, or otherwise initiate, actions or operations in the cloud environment which cause a resource to perform a function. A principal may be, for example, a user account, a service account, a role, and the like. In an embodiment, a principal is implemented as a data structure which includes information about an entity, such as a username, a password hash, an associated role, and the like. In an embodiment, a principal may include a privilege which allows the principal to configure the container engine 210 to run a container.

The production environment 202 is connected with an inspection environment 205. The inspection environment 205 is a cloud computing environment. In an embodiment, the inspection environment 205 is deployed on a cloud computing infrastructure shared with the production environment 202, in another cloud computing infrastructure not shared with the production environment 202, or a combination thereof. In certain embodiments, a portion of the inspection environment 205 is deployed in the cloud production environment 202. In some embodiments, certain workloads deployed in the inspection environment 205 may be deployed in the production environment 202. For example, the inspection environment 205 may access a principal, such as a service account, which allows the inspection environment 205 to initiate actions in the production environment 202.

The inspection environment 205 includes a plurality of inspector workloads, such as inspector 270. In an embodiment, the inspector 270 is configured to inspect virtual instances, such as container images, of the production environment 202 for cybersecurity threats. The inspector 270 may inspect a container, a container image, and the like, for security objects, such as secrets, keys, user account information, and the like. In some embodiments, the inspector 270 is configured to inspect the virtual instance for an application, an operating system, a binary file, a library file, a combination thereof, and the like.

The inspection environment 205 further includes a security database 240, which is a graph database. A security graph may be stored on the security database 240. The security graph includes a representation of the production environment 202. For example, cloud entities of the production environment 202 may be represented each as nodes in the security graph. In an embodiment, the security graph is generated based on objects detected by an inspector, such as inspector 270. In certain embodiments, a virtual instance (e.g., a virtual machine) is represented by a node stored in the security graph. A container, such as container 250, and a corresponding image from which the container was mounted, are also represented each by a node, wherein the node representing the container 250 is connected to a node representing the virtual instance (i.e., VM 230) which runs the container 250. In certain embodiments, generating an instruction to inspect a virtual instance (i.e., container 250) further includes querying a security graph to determine an identifier of a container image represented by a node which is connected to a node representing the container 250.

An inspection controller 260 (also referred to as controller 260) is further included in the inspection environment 205. In an embodiment, the controller 260 is a workload deployed in the inspection environment 205 which is configured to initiate inspection of cloud entities of the production environment 202, such as the cloud entities discussed above. For example, initiating inspection may include determining what cloud entities to inspect, when to inspect them, and the like.

Inspecting virtual instances, such as container 250, is a process which utilizes resources from the production environment 202, such as processing power (measured as I/O per second—IOPS), storage (e.g., for generating a snapshot which is stored and inspected), and the like. Further, while a live container is being inspected, the instance is able to devote less of its own resources to serving its purpose (e.g., providing a service) as those resources are directed in part to the inspection process, such as sending and receiving communication from an inspector 270. Therefore, it is advantageous to reduce this usage to a minimum, while still being able to inspect the entire contents of the container for cybersecurity threats.

In an embodiment, the controller 260 is configured to access a manifest of a volume associated with a container, and detect, based on the manifest, a plurality of layer identifiers of the container 250, each layer including an application, an operating system, a configuration file, a combination thereof, and the like.

Figure 3:
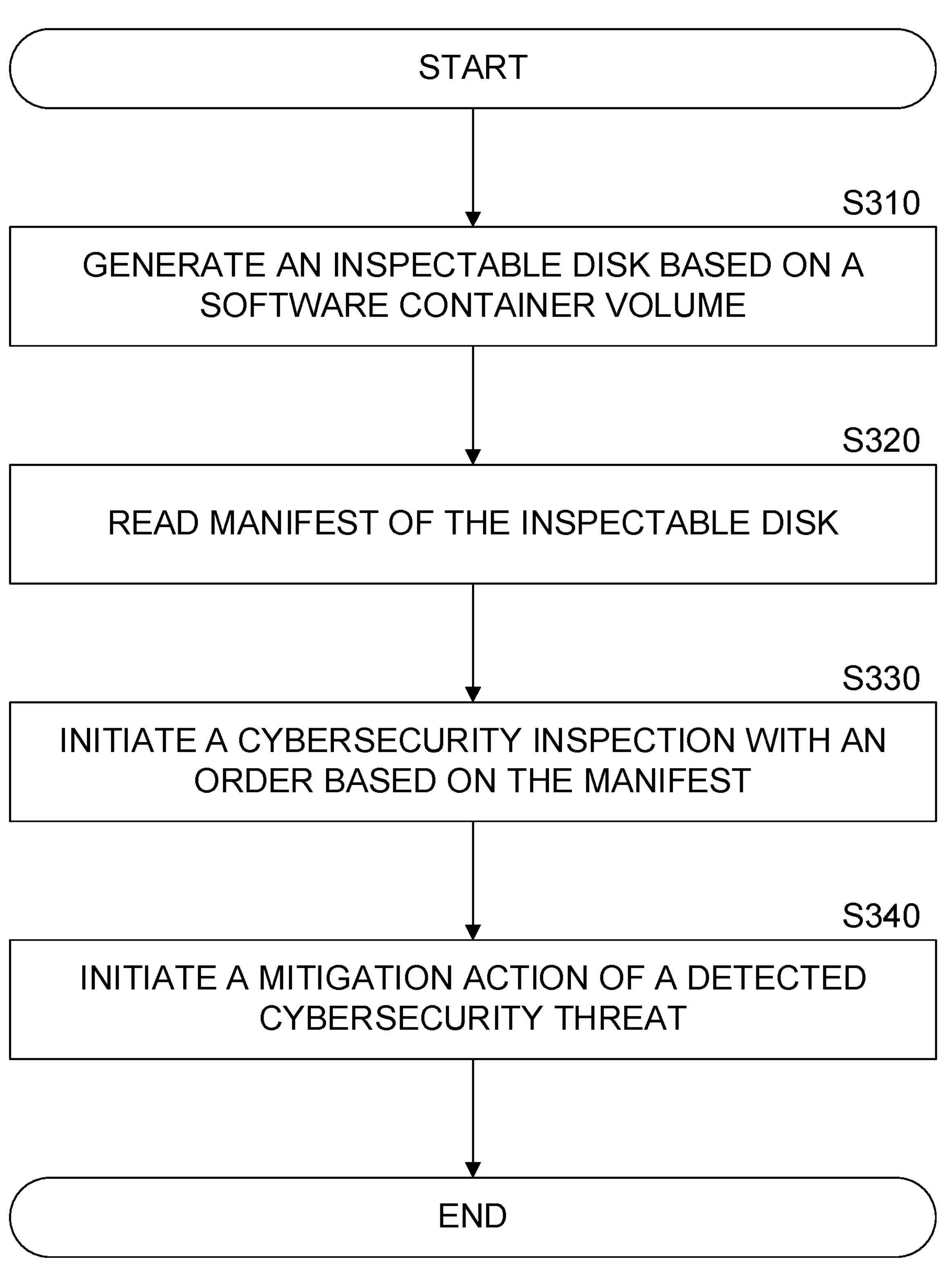
FIG. 3 is an example of a flowchart for inspecting a layered virtualization for a cybersecurity object, implemented in accordance with an embodiment.

FIG. 3 is an example of a flowchart for inspecting a layered virtualization for a cybersecurity object, implemented in accordance with an embodiment. In certain embodiments, a layered virtualization is a software container including a plurality of layers. In an embodiment, a cybersecurity object is an object, a threat, a vulnerability, an exposure, a malware, a combination thereof, and the like.

In certain embodiments, the cybersecurity object is a password, a software application, a certificate, an encryption key, a decryption key, a public encryption key, a private encryption key, a code object, a combination thereof, and the like.

At S310, an inspectable disk is generated. In an embodiment, an inspectable disk is generated based on a volume of a layered virtualization, such as a software container. In some embodiments, an inspectable disk is generated based on a snapshot, a clone, a copy, and the like, of the volume of the layered virtualization.

In certain embodiments, the inspectable disk is generated based on an instruction initiated by an inspection controller, the inspection controller configured to generate inspectable disks.

In some embodiments, the inspectable disk includes an image manifest. In some embodiments, the image manifest is a manifest file. For example, according to an embodiment, the manifest file is a Kubernetes® manifest file, implemented in a markup language such as YAML, JSON, and the like, and includes a description of resources associated with the cluster in which the original disk (based on which the inspectable disk was generated) is deployed.

In some embodiments, the manifest file includes a plurality of layers. For example, in an embodiment, a base layer is deployed from a base image, a first layer is deployed on top of the base layer based on an application, etc.

At S320, a manifest is accessed. In an embodiment, accessing a manifest includes accessing the manifest file of a container cluster. In certain embodiments, the manifest file is processed, for example by parsing the file. In an embodiment, parsing the manifest file includes searching the manifest file for a predetermined data field, and extracting a value associated with the predetermined data field.

In certain embodiments, the manifest includes a plurality of layer identifiers. In some embodiments, a layer is identified by a command, instruction, and the like, which initiate deployment of a virtual asset, provision a virtual asset, deploy an application, a combination thereof, and the like. In an embodiment, the manifest includes an order based on which various layers are deployed, such that a first layer is deployed before a second layer is deployed. In certain embodiments, the layer order is determined based on the manifest, for example by detecting that an instruction to deploy a second layer is nested in an instruction to deploy a first (e.g., base) layer.

At S330, inspection is initiated based on the manifest. In an embodiment, inspection is initiated for a cybersecurity object based on a layer which is selected based on the manifest. For example, in an embodiment, a base layer of the inspectable disk is inspected, e.g., by an inspector, for a first cybersecurity object, and a second layer of the inspectable disk is inspected for a second cybersecurity object. In some embodiments, inspecting the second layer for the second cybersecurity object is performed in response to detecting a cybersecurity object in the prior (e.g., base) layer.

For example, in an embodiment, a base image (i.e., base layer) is inspected for a cybersecurity object, such as an open port. A second layer, deployed on top of the base layer, is then inspected for a second cybersecurity object, such as an application configured to listen on the open port. In some embodiments, a second layer is inspected for a cybersecurity object which is not the second cybersecurity object, or is not inspected at all, based on an inspection of a prior layer.

For example, in an embodiment, inspection of a base layer determines that there are no open ports defined in the base layer. In an embodiment, a second layer, deployed on the base layer, inspection of the second layer for a second cybersecurity object is not initiated, is stopped, and the like, based on the determination of inspection of the base layer. This allows, in certain embodiments, to reduce inspection resources, as there is no need to inspect for a cybersecurity object which cannot be exploited. This is advantageous as it reduces resources such as processor time, processor power, memory, storage, and the like, which are required to perform cybersecurity inspection.

In an embodiment, a cybersecurity object is an endpoint, an open port, a password, a certificate, a cryptographic key, an encryption key, a decryption key, a policy, a file, an application, an operating system, a registry file, a directory name, a hash value, a code object, a malware code, a malware signature, a combination thereof, and the like.

At S340, a mitigation action is initiated. In an embodiment, a mitigation action is initiated in response to detecting: a cybersecurity object, a plurality of cybersecurity objects, a first cybersecurity object on a first layer and a second cybersecurity object on a second layer, a cybersecurity threat, a vulnerability, an exposure, a misconfiguration, a combination thereof, and the like.

In an embodiment, the mitigation action includes generating a representation on a security graph. In some embodiments, a security graph includes a representation of a computing environment, such as the production environment 202 of FIG. 2 above.

In certain embodiments, a security graph represents a resource, a principal, an enrichment, an endpoint, a mitigation action, a cybersecurity object, a cybersecurity threat, a malware object, a code object, combinations thereof, and the like, as a node in the security graph.

In certain embodiments, a node is generated in the security graph to represent a resource, such as a container cluster. Another node is generated in the security graph to represent a disk of the container cluster. Yet another node is generated in the security graph to represent a first layer of the disk, a second node is generated to represent a second layer, etc. In some embodiments, where a cybersecurity object is detected on a particular layer, a node is generated to represent the cybersecurity object, and the nodes are connected, for example by an edge.

In some embodiments, the mitigation action includes generating an instruction which when executed causes another resource, another layer, and the like, to be inspected for a cybersecurity object, a cybersecurity threat, a vulnerability, a misconfiguration, an exposure, a combination thereof, and the like. For example, in an embodiment, the mitigation action, when executed (e.g., by a processing circuitry) configures an inspector to inspect the inspectable disk for another cybersecurity object, cybersecurity threat, malware object, code object, file, folder, and the like.

In certain embodiments, the mitigation action includes deprovisioning of a virtual instance (such as a container pod, a container node, and the like), sandboxing a virtual instance, and the like.

Figure 4:
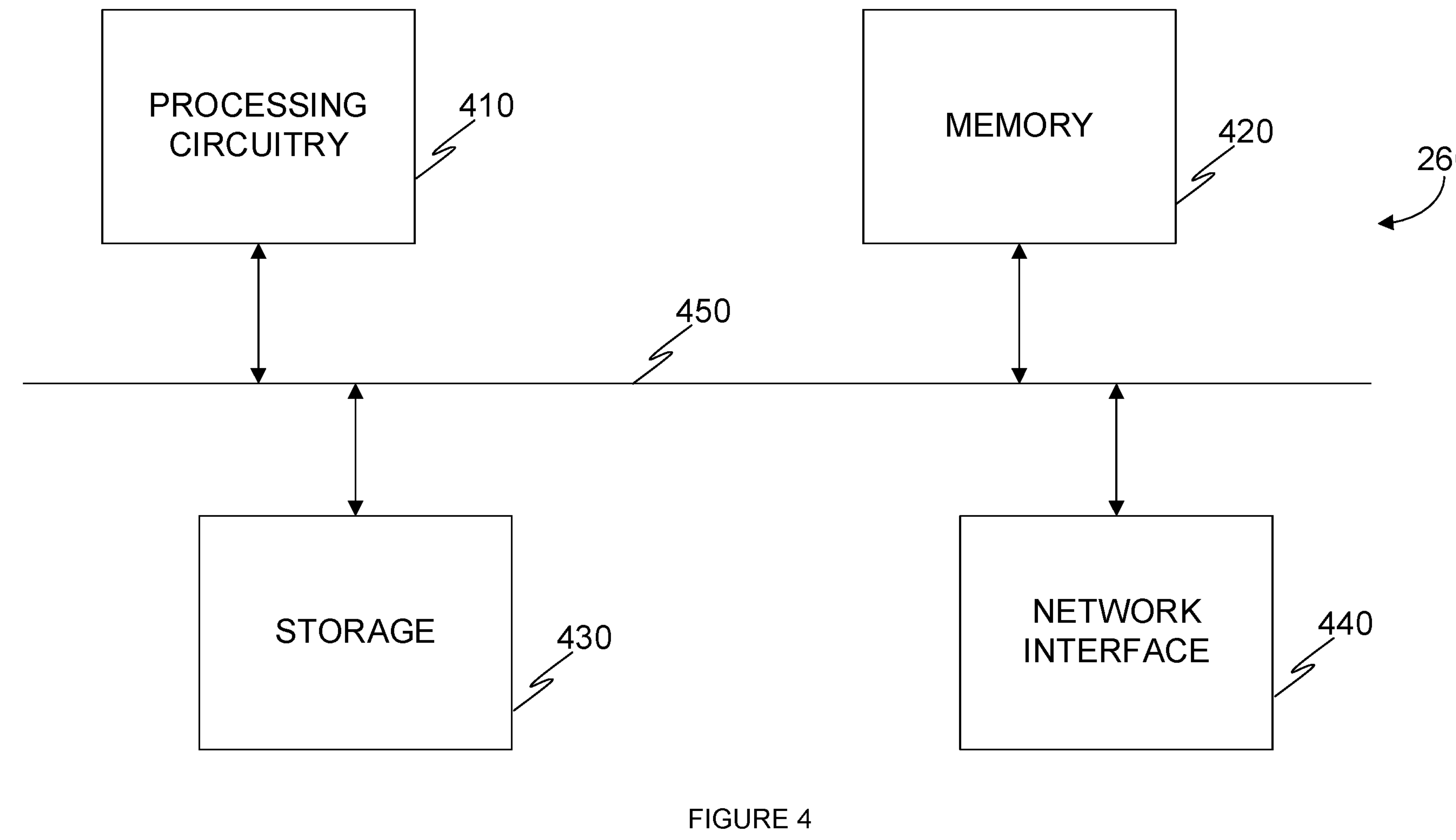
FIG. 4 is an example schematic diagram of an inspection controller according to an embodiment.

FIG. 4 is an example schematic diagram of an inspection controller 260 according to an embodiment. The inspection controller 260 includes a processing circuitry 410 coupled to a memory 420, a storage 430, and a network interface 440. In an embodiment, the components of the inspection controller 260 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof. In an embodiment, the memory 420 is an on-chip memory, an off-chip memory, a combination thereof, and the like. In certain embodiments, the memory 420 is a scratch-pad memory for the processing circuitry 410.

In one configuration, software for implementing one or more embodiments disclosed herein may be stored in the storage 430, in the memory 420, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 440 is configured to provide the inspection controller 260 with communication with, for example, the inspector 270, the security database 240, the repository 220, the container engine 210, and the like.

It should be understood that the embodiments described herein are not limited to the specific architecture illustrated in FIG. 4, and other architectures may be equally used without departing from the scope of the disclosed embodiments.

Furthermore, in certain embodiments the inspector 270 may be implemented with the architecture illustrated in FIG. 4. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for cybersecurity inspection of a volume based on image layers, comprising:

generating an inspectable disk based on a volume of a virtual instance that is deployed in a production computing environment, the volume generated based on a plurality of images, each image corresponding to a unique layer of a plurality of layers;

parsing a manifest associated with the volume, the manifest including an identifier of each unique layer to determine an order of layers based on the manifest, wherein a first layer of the virtual instance is deployed prior to a second layer of the virtual instance;

initiating inspection for a cybersecurity object on a first layer of the plurality of layers;

inspecting the second layer for a second cybersecurity object, in response to detecting a cybersecurity object on the first layer;

initiating a mitigation action in response to detecting the cybersecurity object; and deleting an instruction to inspect the second layer for a second cybersecurity object, in response to detecting that the first layer does not include a first cybersecurity object.

2. The method of claim 1, further comprising:

initiating inspection for the cybersecurity object on the second layer, in response to determining that inspection of the first layer is complete.

3. The method of claim 1, further comprising:

searching the manifest for a predetermined data field; and extracting a value associated with the predetermined data field from the manifest.

4. The method of claim 1, further comprising:

generating a node representing the cybersecurity object on a security graph, wherein the security graph includes a representation of the production computing environment in which the virtual instance is deployed; and connecting the node representing the cybersecurity object to a node representing the virtual instance in the security graph.

5. The method of claim 1, further comprising:

deprovisioning the virtual instance in response to detecting the cybersecurity object.

6. The method of claim 1, further comprising:

initiating the mitigation action further in response to detecting a plurality of cybersecurity objects.

7. The method of claim 1, wherein the cybersecurity object is any one of: an endpoint, an open port, a password, a certificate, a cryptographic key, an encryption key, a decryption key, a policy, a file, an application, an operating system, a registry file, a directory name, a hash value, a code object, a malware code, a malware signature, and any combination thereof.

8. A non-transitory computer-readable medium storing a set of instructions for cybersecurity inspection of a volume based on image layers, the set of instructions comprising:

one or more instructions that, when executed by one or more processors of a device, cause the device to:

generate an inspectable disk based on a volume of a virtual instance that is deployed in a production computing environment, the volume generated based on a plurality of images, each image corresponding to a unique layer of a plurality of layers;

parse a manifest associated with the volume, the manifest including an identifier of each unique layer to determine an order of layers based on the manifest, wherein a first layer of the virtual instance is deployed prior to a second layer of the virtual instance;

initiate inspection for a cybersecurity object on a first layer of the plurality of layers;

inspect the second layer for a second cybersecurity object, in response to detecting a cybersecurity object on the first layer;

initiate a mitigation action in response to detecting the cybersecurity object; and delete an instruction to inspect the second layer for a second cybersecurity object, in response to detecting that the first layer does not include a first cybersecurity object.

9. A system for cybersecurity inspection of a volume based on image layers comprising:

a processing circuitry; and a memory, the memory containing instructions that, when executed by the processing circuitry, configure the system to:

generate an inspectable disk based on a volume of a virtual instance that is deployed in a production computing environment, the volume generated based on a plurality of images, each image corresponding to a unique layer of a plurality of layers; parse a manifest associated with the volume, the manifest including an identifier of each unique layer to determine an order of layers based on the manifest, wherein a first layer of the virtual instance is deployed prior to a second layer of the virtual instance;

initiate inspection for a cybersecurity object on a first layer of the plurality of layers;

inspect the second layer for a second cybersecurity object, in response to detecting a cybersecurity object on the first layer;

initiate a mitigation action in response to detecting the cybersecurity object; and delete an instruction to inspect the second layer for a second cybersecurity object, in response to detecting that the first layer does not include a first cybersecurity object.

10. The system of claim 9, wherein the memory contains further instructions which when executed by the processing circuitry further configure the system to:

initiate inspection for the cybersecurity object on the second layer, in response to determining that inspection of the first layer is complete.

11. The system of claim 9, wherein the memory contains further instructions which when executed by the processing circuitry further configure the system to:

search the manifest for a predetermined data field; and extract a value associated with the predetermined data field from the manifest.

12. The system of claim 9, wherein the memory contains further instructions which when executed by the processing circuitry further configure the system to:

generate a node representing the cybersecurity object on a security graph, wherein the security graph includes a representation of the production computing environment in which the virtual instance is deployed; and connect the node representing the cybersecurity object to a node representing the virtual instance in the security graph.

13. The system of claim 9, wherein the memory contains further instructions which when executed by the processing circuitry further configure the system to:

deprovision the virtual instance in response to detecting the cybersecurity object.

14. The system of claim 9, wherein the memory contains further instructions which when executed by the processing circuitry further configure the system to:

initiate the mitigation action further in response to detecting a plurality of cybersecurity objects.

15. The system of claim 9, wherein the cybersecurity object is any one of:

an endpoint, an open port, a password, a certificate, a cryptographic key, an encryption key, a decryption key, a policy, a file, an application, an operating system, a registry file, a directory name, a hash value, a code object, a malware code, a malware signature, and any combination thereof.

* * * * *